United States Patent [19]

Fry

[11] Patent Number: 4,852,679

[45] Date of Patent: Aug. 1, 1989

[54] WHEELCHAIR STEERING

[76] Inventor: Jeremy J. Fry, The Brewery, Freshford, Bath BA3 6BU, Great Britain

[21] Appl. No.: 102,918

[22] Filed: Sep. 30, 1987

[51] Int. Cl.⁴ .......................... B62D 7/08; A61G 5/04
[52] U.S. Cl. ............................... 180/234; 74/471 XY; 180/333; 180/907; 280/47.11; 280/99; 280/250.1
[58] Field of Search ................ 180/7.1, 333, 907, 233, 180/234, 236, 168, 140; 280/47.11, 242 WC, 289 UC, 99; 74/471 XY

[56] References Cited

U.S. PATENT DOCUMENTS

| 3,077,354 | 2/1963 | Rateau | 280/99 |
|---|---|---|---|
| 3,134,455 | 5/1964 | Fiorentini | 180/140 |
| 3,978,738 | 9/1976 | Naulin | 74/471 XY |
| 4,403,673 | 9/1983 | Ball | 180/907 X |
| 4,519,466 | 5/1985 | Shiraishi | 180/7.1 |
| 4,598,782 | 7/1986 | Ilon | 180/140 X |
| 4,634,941 | 1/1987 | Klimo | 180/907 X |

FOREIGN PATENT DOCUMENTS

| 0026098 | 4/1981 | European Pat. Off. | |
| 1294058 | 4/1962 | France | 74/471 XY |
| 131462 | 10/1981 | Japan | 180/236 |
| 120231 | 6/1987 | Japan | 280/91 |
| 128833 | 6/1987 | Japan | 180/234 |
| 392289 | 11/1965 | Switzerland | 280/103 |
| 1088722 | 10/1967 | United Kingdom | |
| 1158621 | 7/1969 | United Kingdom | |
| 1330597 | 9/1973 | United Kingdom | 280/99 |
| 1485387 | 9/1977 | United Kingdom | |
| 2116131 | 3/1982 | United Kingdom | |
| 2159601 | 5/1984 | United Kingdom | |
| 2184987 | 7/1987 | United Kingdom | 180/907 |
| 2184988 | 7/1987 | United Kingdom | 180/907 |

Primary Examiner—Mitchell J. Hill
Attorney, Agent, or Firm—Fleit, Jacobson, Cohn, Price, Holman & Stern

[57] ABSTRACT

A powered wheelchair has at least two power-steered, driven wheels (15,16,17,18). Preferably, all of the wheels (15,16,17,18) are driven and power-steered such that the wheelchair turns about a point on a transverse axis (X) of the vehicle, and may preferably also pivot on the spot. This turning is preferably achieved by a rotatable steering assembly (1) having steering drive cams (3,4), steering return cams (5,6) and flexible transmission members (13,14).

3 Claims, 10 Drawing Sheets

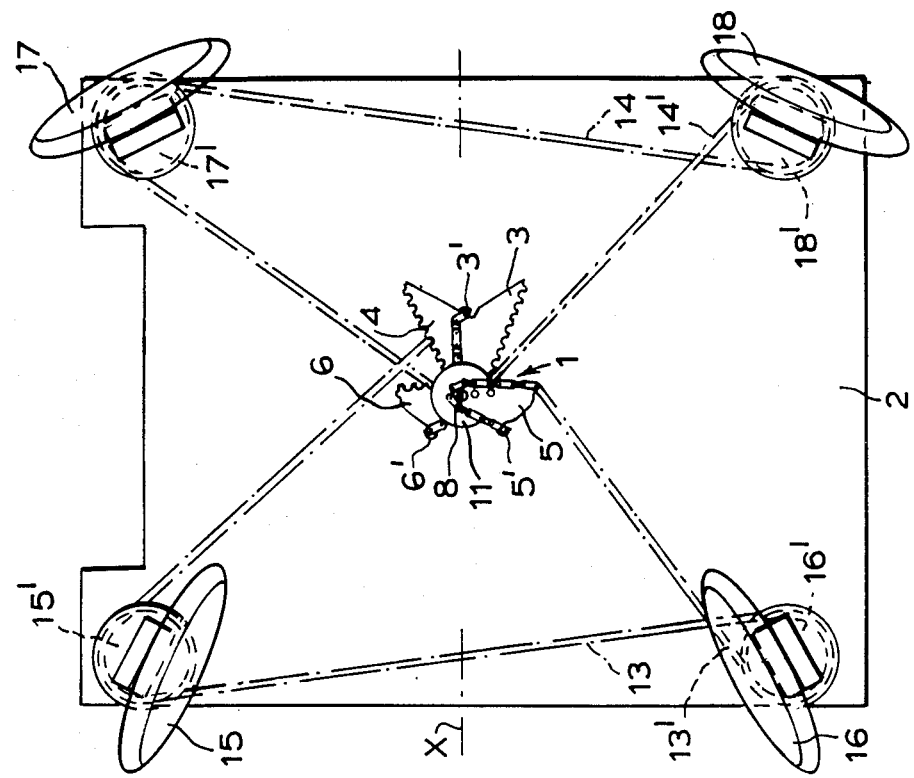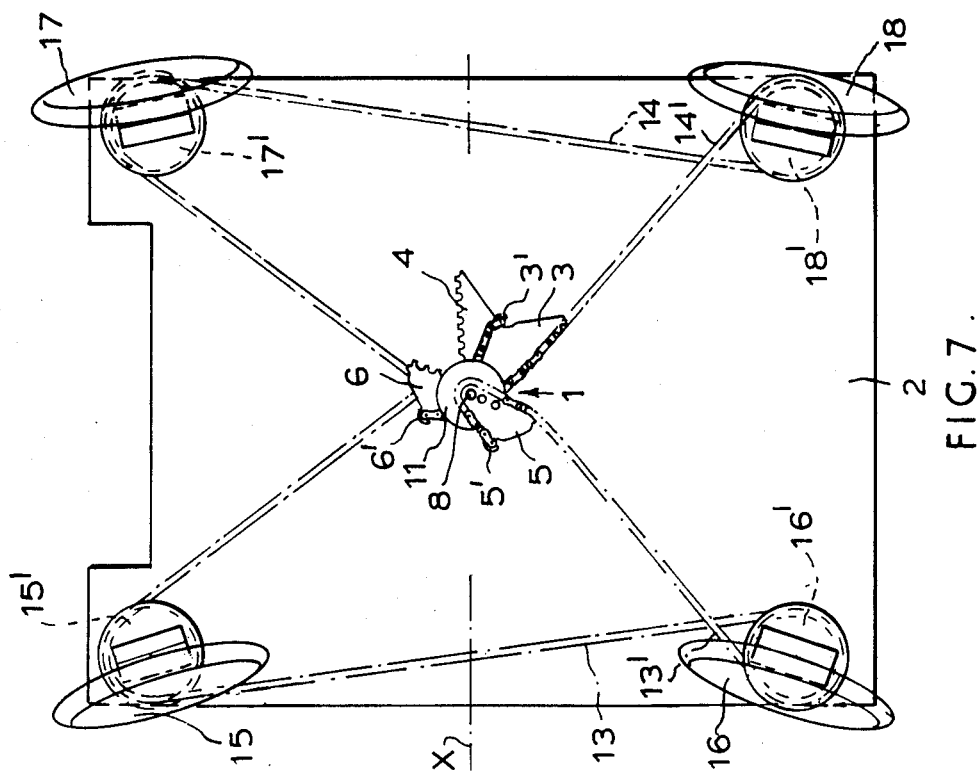

WHEELCHAIR STEERING

The present invention relates to steering for a powered wheelchair.

BACKGROUND OF THE INVENTION

It is known to provide steering for a powered wheelchair by varying either the power or the direction of rotation to either of the fixed-axle driving wheels whether they are at the front or the rear of the vehicle. The remaining wheels or pair of wheels are castors.

When such a wheelchair crosses a slope the weight of the chair and its occupant turns the castors in the direction of the slope causing the chair to be deflected from the selected direction. Furthermore, when a wheel on one side of the chair meets an obstruction or resistance greater than the other side there is a tendency for the chair to turn in the direction of that obstruction. If the slope, obstruction or resistance is considerable, then the unwanted change of direction can seriously endanger the occupant. It is for this reason that powered wheelchairs with castor wheels are generally considered unsafe except when used on comparatively flat and even surfaces.

It is also known that to overcome this problem a steering motor can be added to the castors and arranged to be controlled by a joystick, but this arrangement provides only a limited steering radius which, although perfectly acceptable for outdoor use, is not acceptable indoors.

SUMMARY OF THE INVENTION

The invention provides a powered wheelchair having at least two power-steered, driven wheels. Preferably, all the wheels are power-steered and driven. This enables the steering difficulties of known wheelchairs to be substantially overcome.

Preferably, all the power-steered wheels are steered by means of a single steering motor, preferably operating via a self-locking gearing, thereby ensuring that the steering is not altered when the wheelchair is on a slope or encounters obstacles.

Preferably, the steering motor is controlled by means of a joystick assembly, preferably in conjunction with a feedback mechanism. Thus, the wheelchair may be steered by the occupant with minimal effort.

Preferably, the wheels are steerable into a position in which the centre of turning lies centrally of the vehicle so as to allow turning on the spot.

Preferably, a rotatable steering assembly is provided comprising a pair of steering drive cams and a pair of steering return cams connected to respective offside and nearside wheels by a respective flexible transmission member, e.g. a chain.

The rotatable steering assembly, particularly the cams, may be manufactured very conveniently using an industrial laser.

BRIEF DESCRIPTION OF THE DRAWINGS

An embodiment of the invention will now be described with reference to the accompanying drawings, wherein:

FIGS. 3 to 9 are underside views of the wheelchair base showing different positions of the steering assembly and hence of the wheelchair wheels.

DETAILED DESCRIPTION OF THE DRAWINGS

Figure 1:
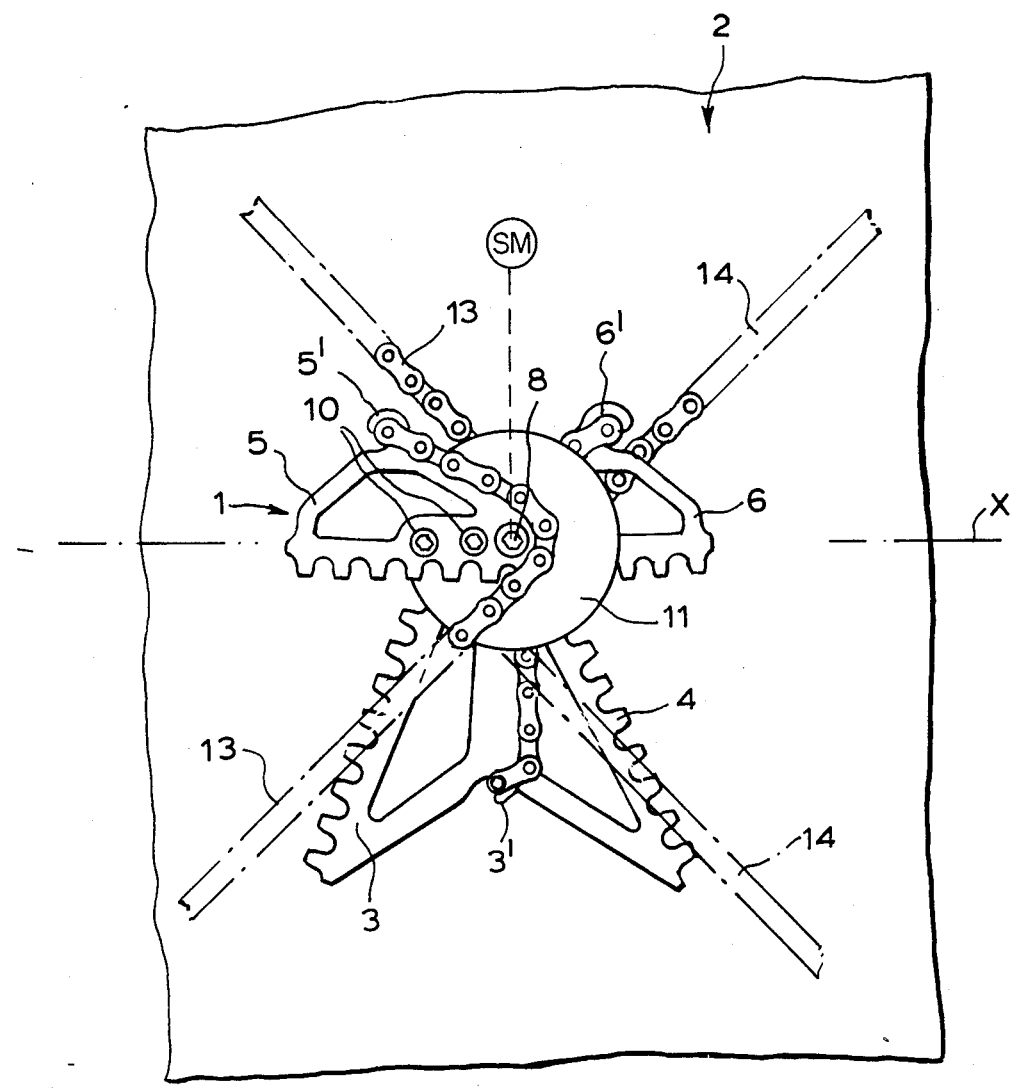
FIG. 1 is an underside view of part of a wheelchair base showing the steering assembly.
Figure 2A:
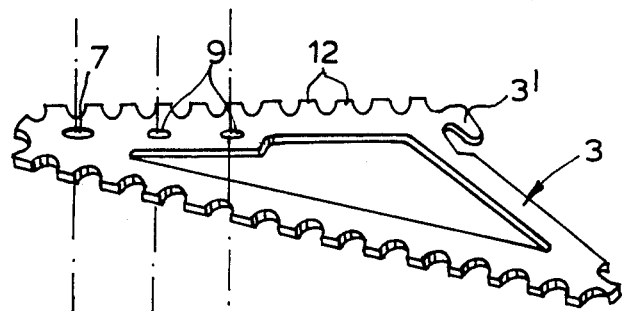
FIGS. 2a to 2d are perspective views of the cams of the steering assembly.
Figure 2B:
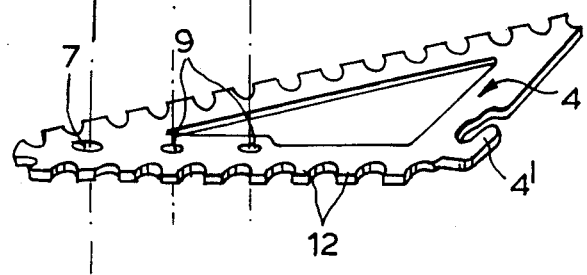
Figure 2C:
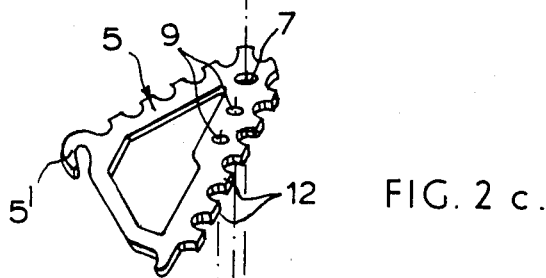
Figure 2D:
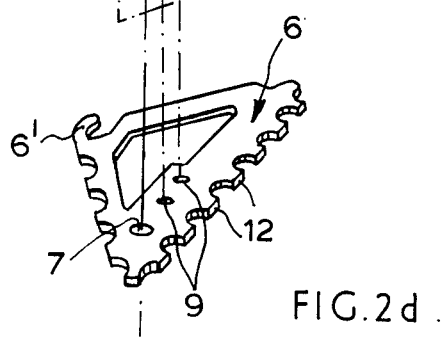

In FIG. 1 the wheelchair has a steering assembly 1 rotatably mounted on a wheelchair base 2. The steering assembly comprises a pair of steering drive cans 3, 4 and a pair of return drive cams 5, 6.

The steering drive cams 3 and 4, and the steering return cams 5 and 6 are shown separately in FIGS. 2a to d. Each cam has a hole 7 for a steering assembly shaft 8, and two holes 9 for fixing pins 10. The cams are separated by spacers (not shown) and are attached to fixing plates 11 by the pins 10; only one fixing plate can be seen in FIG. 1. The cams are provided with cam surfaces having teeth 12 and respective hooks 3', 4', 5' and 6'.

As can be seen from FIGS. 3 to 9, which shows the underside of the wheelchair, the steering drive cam 3 is drivingly connected to the return drive cam 5 by means of a chain 13, and the steering drive cam 4 is drivingly connected to the return drive cam 6 by means of a chain 14. The ends of the chains 13 and 14 are fixedly connected to the hooks 3', 5' and 4', 6', respectively.

The chain 13 extends from the steering drive cam 3 around a sprocket 15' of a front right wheel 15, in a reverse loop around a sprocket 16' of a rear right wheel 16 and to the return drive cam 5. The chain 13 is divided at the sprocket 16' into portions 13' and 13" attached to the sprocket 16' and lying in vertically-spaced planes so that cross-over portions of the reverse loop are clear of each other.

Similarly, the chain 14 extends from the steering drive cam 4 around a sprocket 17' of a front left wheel 17, in a reverse loop around a sprocket 18' of a rear left wheel 18 and to the return drive cam 6. The chain 14 is similarly divided into portions 14' and 14" attached to the sprocket 18' and lying in vertically-spaced planes. The steering assembly 1 is rotated by means of a steering motor SM and an associated self-locking gearing to any desired position shown in FIGS. 3 to 9. The steering motor SM is attached to the shaft 8 and is only shown schematically in FIG. 13.

Figure 3:
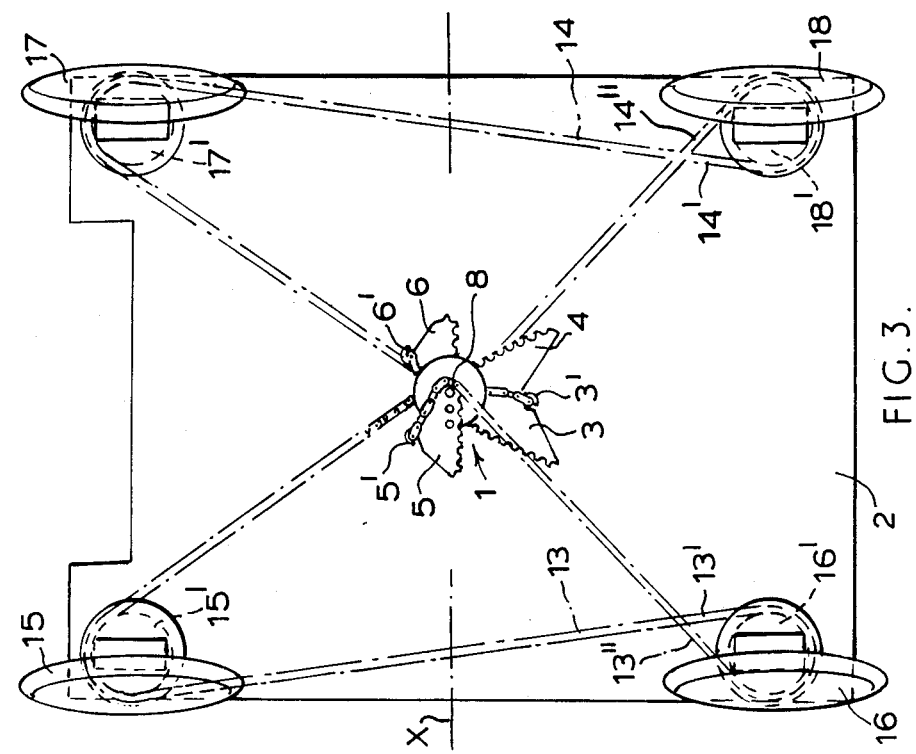

In FIG. 3, the steering assembly is in a centralised position with the wheels 15 to 18 straight for straight-ahead or straight-reverse movement of the wheelchair.

Figure 4:
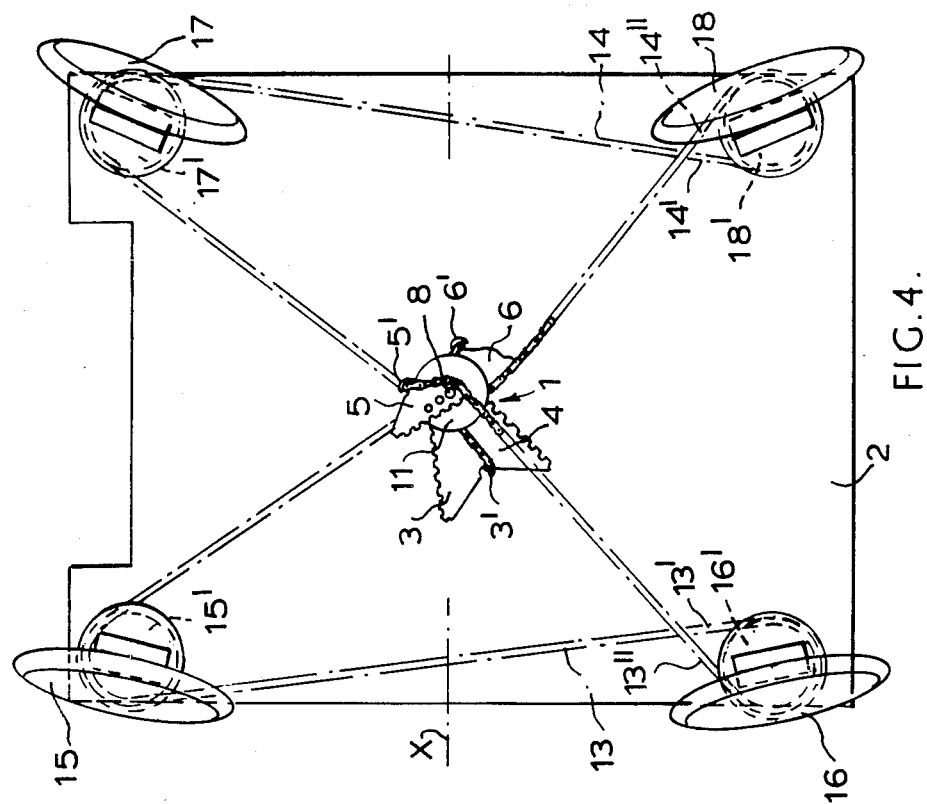
Figure 5:
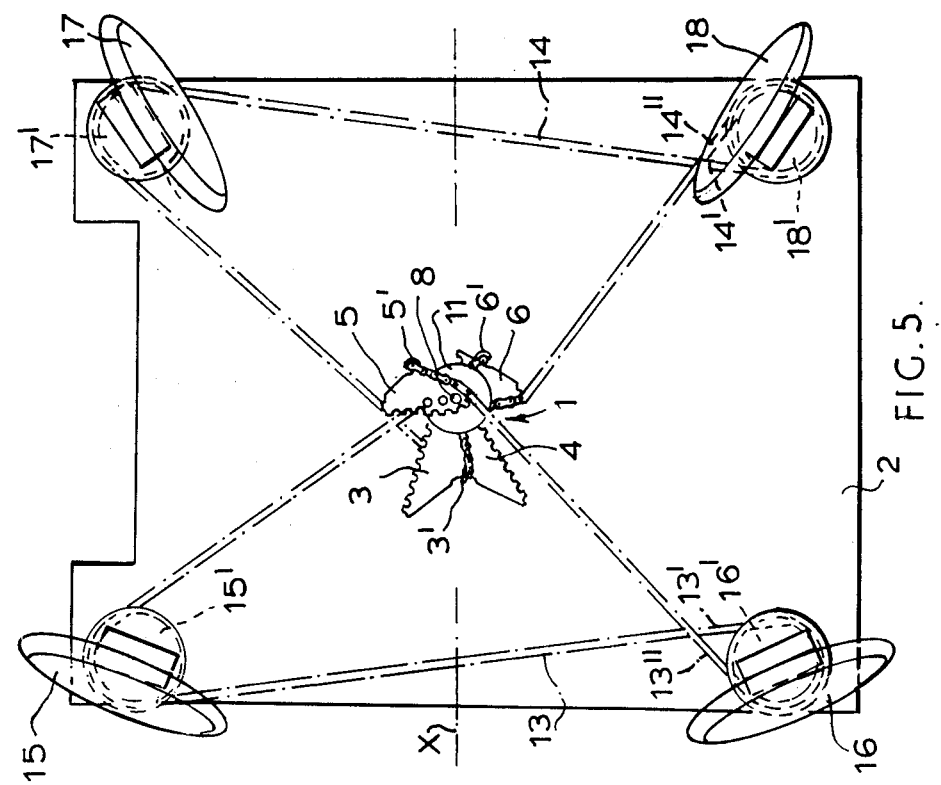

If it is desired to turn the wheelchair to the left, the wheels are turned to the left by anti-clockwise rotation (when viewed from above) of the steering assembly 1. As can be seen in FIGS. 4 and 5, the steering drive cam 3 exerts a winding pull on the chain 13 to turn the front wheel 15. The rear wheel 16 is turned by a similar amount in the opposite direction as the chain 13 is unwound from the steering return cam 5. Simultaneously, the chain 14 is wound onto the steering return cam 6 and unwound from the steering drive cam 4 to turn the wheels 17, 18 in the same direction as the wheels 15, 16, respectively.

The cams 3 to 6 are suitably shaped so that the wheels 15 to 18 all have the same centre of turning, which lies on a central transverse axis X of the wheelchair.

When the steering assembly 1 is rotated still further anti-clockwise from the position shown in FIG. 5 an extremely interesting development occurs. The steering return cam 6 winds the chain 14 sufficiently to turn the wheel 18 through about a further 90°. The wheel 17 is turned through a similar amount by the chain 14 as a result of a compensatory turning of the steering drive cam 4. During this movement, the wheels 15, 16 turn through about a further 30°.

Figure 6:
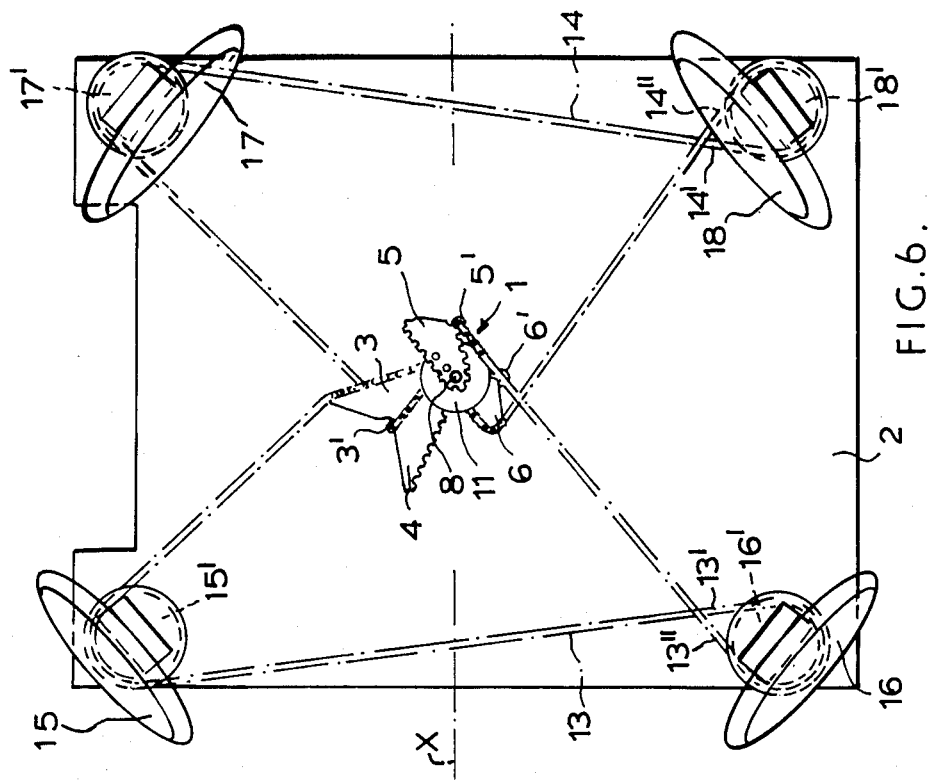

The wheels 15 to 18 are now in a position as shown in FIG. 6 in which the wheels 15, 16 face outwardly and the wheels 17, 18 face inwardly of the base 2. However, all four wheels 15 to 18 have a centre of rotation at the centre of the base 2, i.e. on the shaft 8. Thus, when the wheelchair is driven it will turn on the spot. This is a most useful manoeuvre for a wheelchair.

Reversing the rotation of the steering assembly 1 brings the wheels 15 to 18 back to the straight position shown in FIG. 3.

Rotation of the steering assembly 1 in a clockwise direction (when viewed from above) from the position shown in FIG. 3 causes the steering drive cam 4 to exert a winding pull on the chain 14 and turn the front wheel 17. The rear wheel 14 is turned by a similar amount in the opposite direction as the chain 14 is unwound from the steering return cam 6. Simultaneously, the chain 13 is wound onto the steering return cam 5 and unwound from the steering drive cam 3 to turn the wheels 15, 16 in the same direction as the wheels 17, 18, respectively. The wheels 15 to 18 take up the steered positions shown in FIGS. 7 and 8. As before, the centre of turning lies on the central transverse axis X.

Figure 9:
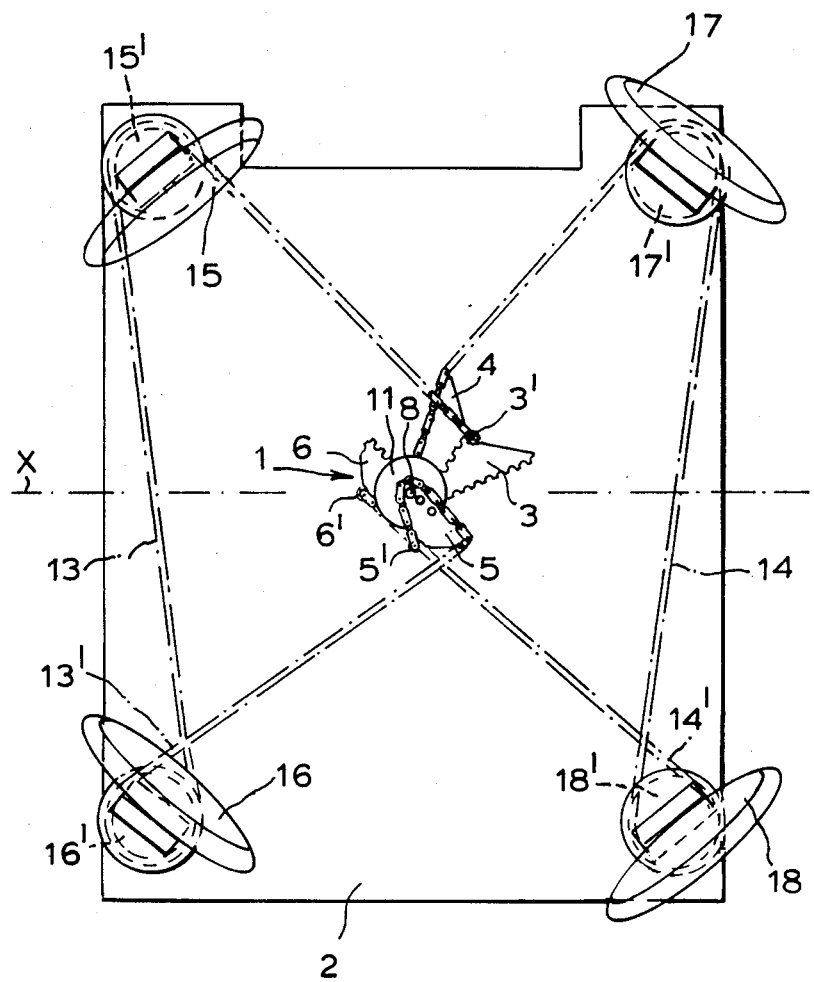

If the steering assembly is rotated still further clockwise the wheels 17, 18 are turned further to face the centre, i.e. shaft 8. The steering return cam 5 winds the chain 13 sufficiently to turn the wheel 16 inwardly to face the centre shaft 8. The wheel 15 is turned similarly by the chain 13 as a result of a compensatory turning of the steering drive cam 3. A position is now reached as shown in FIG. 9, similar to that shown in FIG. 6, in which all four wheels 15 to 18 have a centre of turning lying on the central shaft 8. Thus the wheelchair can again turn on the spot.

The wheels 15 to 18 may be returned to the "straight" position shown in FIG. 3 by reversing the rotation of the steering assembly.

The steering assembly 1, particularly the cams 3 to 6, may be made very conveniently using an industrial laser.

As can be seen from a comparison of the extreme positions of the steering assembly as shown in FIGS. 6 and 9, the steering assembly turns through an angle of about 270°, i.e. about 135° on either side of the straight position shown in FIG. 3.

Figure 10:
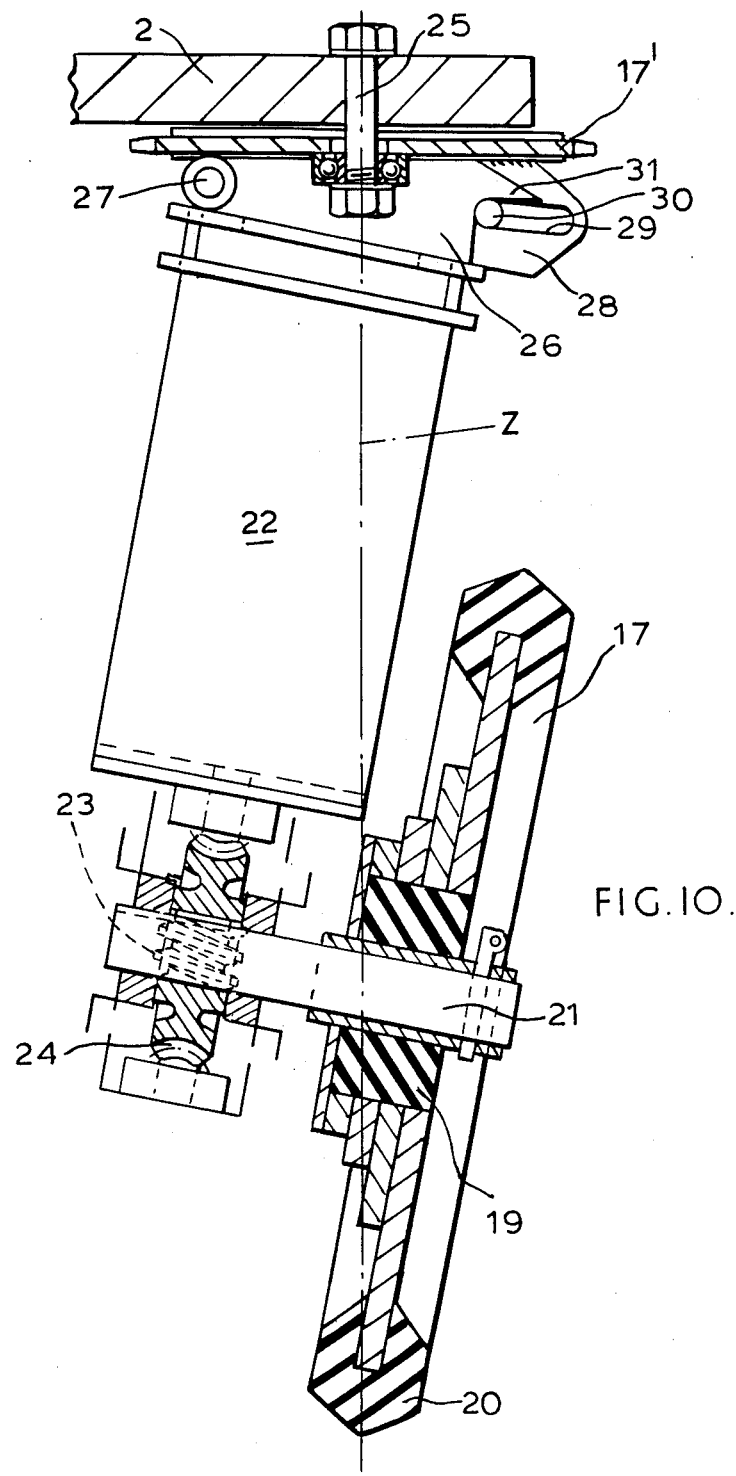
FIG. 10 is a front, part-sectional view of a wheel connected to the wheelchair base.

The manner in which the chains turn the wheels may be seen from FIG. 10. A wheel, e.g. wheel 17 having a cushion drive 19 and a tyre 20 is mounted on a spindle 21 driven by an electric motor 22, e.g. by means of a worm 23 and worm wheel 24, as described in more detail in my copending application Ser. No. 103,041 entitled "Wheelchair Drive" of even date.

The electric motor 22 is rotatably mounted on the base 2 by means of a bolt 25. The upper end of the motor 22 is provided with a wedge-shaped plate 26, so that the point of contact of the tyre 20 lies on the vertical axis Z through the bolt 25 thereby avoiding wheel scuffing. The wedge-shaped plate 26 is pivotally mounted by means of a hinge pin 27 to a hinge plate 28 having a slot 29 engaged by a sliding catch 30 biased into a position as shown in FIG. 10. When the catch 30 is slid in the slot 29 away from a shoulder 31 of the wedge plate 26, the motor 22 carrying the wheel 17 may be pivoted up against the underside of the base 2.

A sprocket plate 17' is arranged between the base 2 and the hinge plate 28. As shown in FIGS. 3 to 9, the chain 14 engages the sprocket plate 17' to turn the motor 22, and hence the wheel 17, during steering. The wheels 15, 16 and 18 are turned in a similar way by the respective chains 13, 14.

Preferably, each wheel 15 to 18 is driven by a respective electric motor 22 as described in my copending application "Wheelchair Drive" already referred to.

Figure 11:
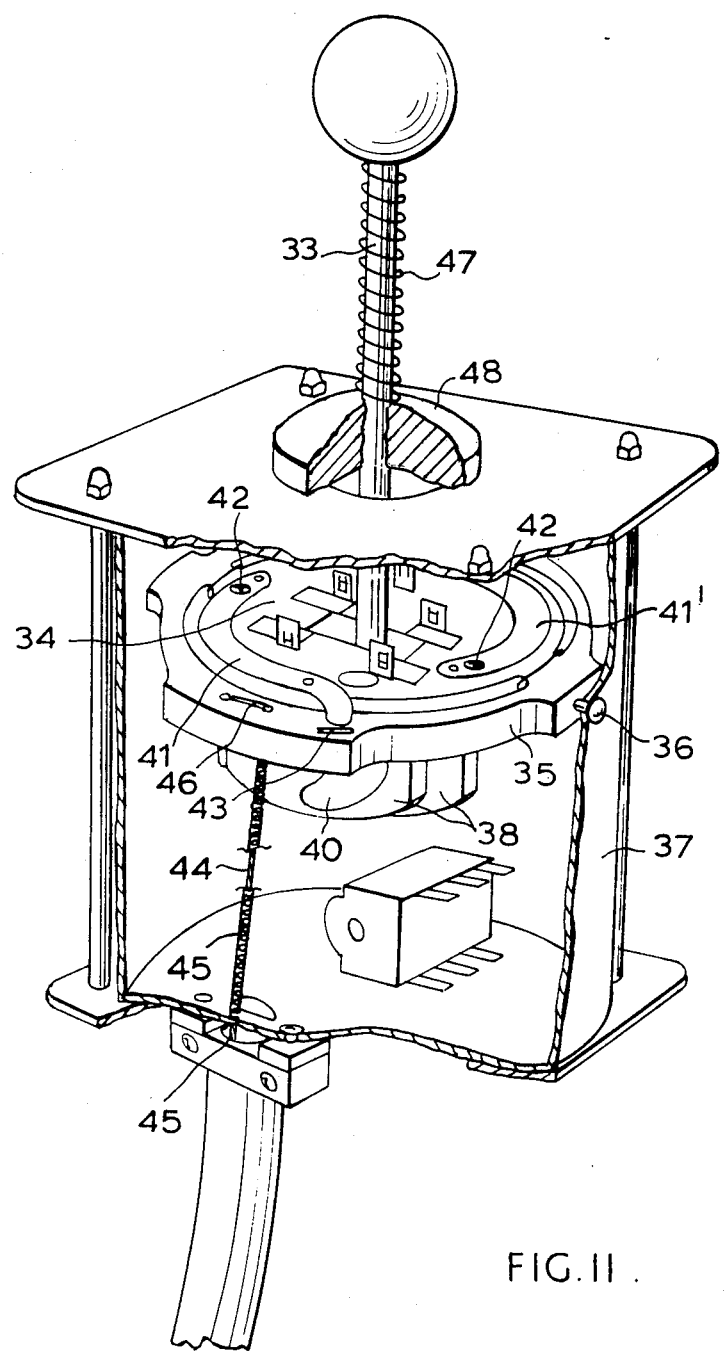
FIG. 11 is a perspective part-sectional view of a joystick assembly.
Figure 12:
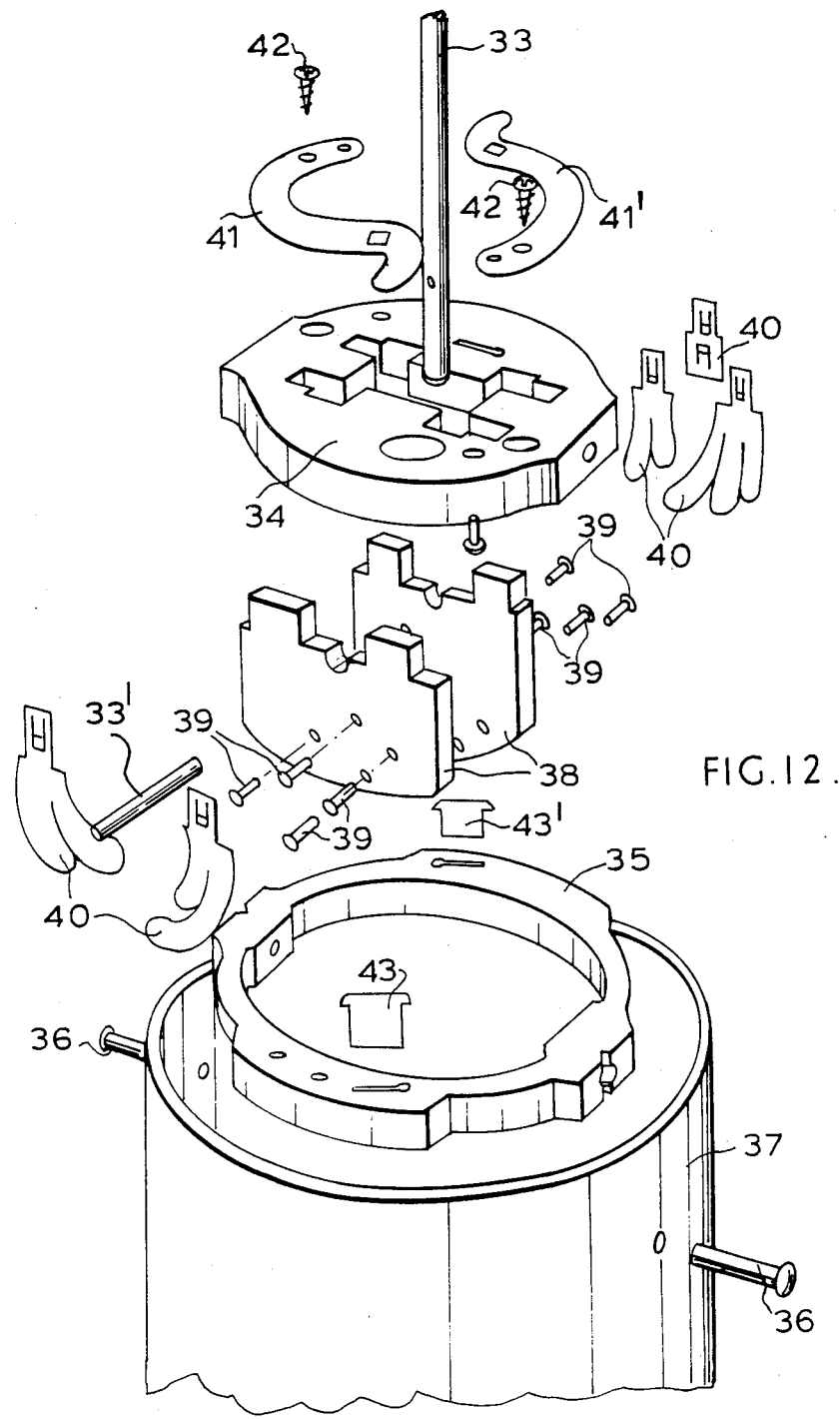
FIG. 12 is an exploded view of the joystick assembly of FIG. 11.

The steering motor SM is controlled by means of a joystick assembly as shown in FIGS. 11 and 12 comprising a joystick 33 and a swash plate 34 movable in a gimbal ring 35 pivotally mounted on pivots 36 in a housing 37. The joystick 33 is mounted on an axle 33' held between two rocker plates 38 which in turn are rigidly connected to the swash plate 34 and carry a plurality of contact points 39. A plurality of resilient metal terminals or fingers 40 are carried by the swash plate 34 to engage the point contacts 39 on forward and backward movement of the joystick 33, so as to provide various forward and reverse speeds of the wheelchair via the wheel motors 22 and relays (described below with reference to FIG. 13). Two S-shaped metal strips 41, 41' are attached to the swash plate 34 by means of screws 42. The gimbal ring 35 carries two contacts 43, 43' arranged just below the S-shaped strips 41. Movement of the joystick 33 to the left or right in FIG. 11 brings the strip 41 or 41' into electrical contact with contact 43 or 43', respectively to complete a circuit and operate a relay r5 (FIG. 13) so as to start the steering motor SM.

The feedback mechanism is provided in the form of a Bowden cable 44 inside a compression spring 45. The Bowden cable 44 is connected at one end 46 to the gimbal ring 35 and at the other end to a cam follower (not shown) engaging with a steering feedback cam (not shown) of the steering assembly 1. Operation of the joystick 33 to complete a circuit between S-contact 41 and contact 43 actuates the steering motor SM. After the steering motor SM has turned the steering assembly 1 through a pre-determined angle determined by the steering feedback cam and the cam follower (not shown), the steering motor SM pulls the Bowden cable 44 so as to tilt the gimbal ring 35. This breaks the circuit between the S-contact 41 and the contact 43 thereby stopping the steering motor SM.

When the joystick 33 is released it is returned to a central position by means of a compression spring 47 acting on a suitably-shaped plate 48. The S-contact 41' then completes a circuit with contact 43' thereby operating a relay r6 (FIG. 13) to start the steering motor in the reverse direction to bring the steering assembly 1, and hence the wheels 15 to 18, into the centralised straight position as shown in FIG. 3. During this movement, the spring 45 pushes the gimbal ring back to a horizontal position and breaks the circuit between the S-contact 41' and the contact 43' so that the steering motor stops when the steering assembly has reached the position shown in FIG. 3.

The feedback mechanism may be replaced by any other suitable mechanism operating, e.g. hydraulically, pneumatically, electrically or electronically.

Figure 13:
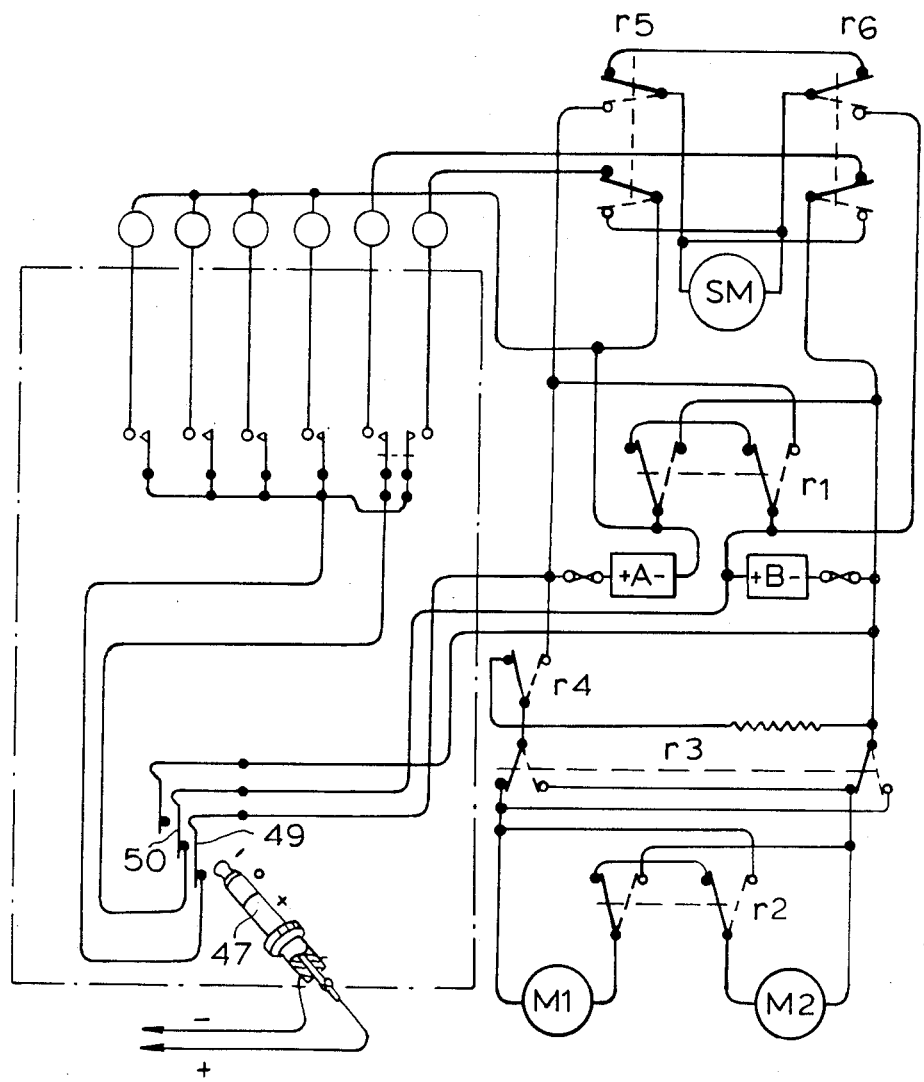
FIG. 13 is a circuit diagram for the wheelchair showing the steering motor.

As can be seen from FIG. 13, the steering motor SM is driven by batteries A and B. Battery A will drive the steering motor SM in one direction to turn the wheels 15 to 18 in one direction and will drive the steering motor SM in the other direction to turn the wheels 15 to 18 in the other direction.

Whether the batteries A and B are connected in parallel or in series for driving the drive motors 22 (represented in FIG. 13 by unitary drives $M_1$ and $M_2$ and described in my copending application "Wheelchair Drive" already referred to) they will discharge substantially equally when operating the steering motor SM, which will always operate on the same voltage regardless of the voltage to the drive motors.

In FIG. 13, a telephone type jack plug 47 is shown for connecting the batteries A and B to a charger (not shown). Conveniently, the jack plug 47 is placed near the joystick assembly so as to encourage the driver to change the batteries regularly. Contacts 49, 50 of a jack plug socket ensure that the batteries A and B are automatically disconnected from the motors $M_1$, $M_2$ and SM when the jack plug 47 is connected to a charger.

What is claimed is:

1. A powered wheelchair having a transverse axis, front and back left and front and back right wheels, all of said wheels being driven and power-steered, and a rotatable steering assembly for steering said wheels comprising a pair of steering drive cams, a pair of steering return cams, and first and second flexible transmission members connecting one of said steering drive cams and one of said steering return cams to said left and right wheels respectively, so that the center of turning of said wheels lies on said transverse axis of said wheelchair said drive and return cams being differently shaped for differentially rotating said left and right wheels and moving center of turning to a position within the confines of the wheels responsive to rotation of the steering assembly through a predetermined angle.

2. A powered wheelchair according to claim 1, wherein each said flexible transmission member extends from one of said steering cams, around one of said front wheels, in a reverse loop around one of said back wheels and to one of said steering return cams.

3. A powered wheelchair having a transverse axis and more than two wheels, all of said wheels being driven and power-steered, a steering assembly including rotatable steering cam means, and flexible transmission means connected between the cam means and the wheels for steering said wheels with a center of turning lying on said transverse axis by winding the transmission means around the cam means responsive to rotation of the cam means, and a steering motor for rotating the cam means, the cam means being profiled for steering said wheels into a position in which said center of turning is located within the confines of said wheels responsive to a predetermined degree of rotation of the cam means, wherein the wheels include a pair of left-hand wheels and a pair of right-hand wheels, wherein said steering cam means includes a first steering drive cam and a first steering return cam for the left-hand wheels and a second steering drive cam and a second steering return cam for the right-hand wheels and wherein the transmission means includes a first flexible transmission member for the left-hand wheels and second flexible transmission member for the right-hand wheels, said first transmission member extending from said first steering drive cam around one of said left-hand wheels in a reverse loop around the other of said left-hand wheels to said first steering return cam and said second transmission member extending from said second steering drive cam around one of said right-hand wheels in a reverse loop around the other of said right-hand wheels to said second steering return cam.

* * * * *